(No Model.)  2 Sheets—Sheet 1.
W. T. SEARS.
DIFFERENTIAL HOIST.
No. 515,696. Patented Feb. 27, 1894.
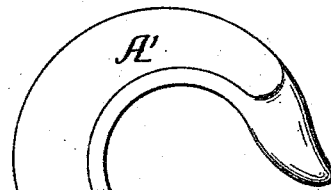
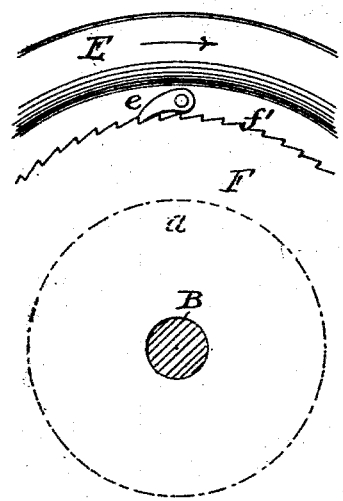
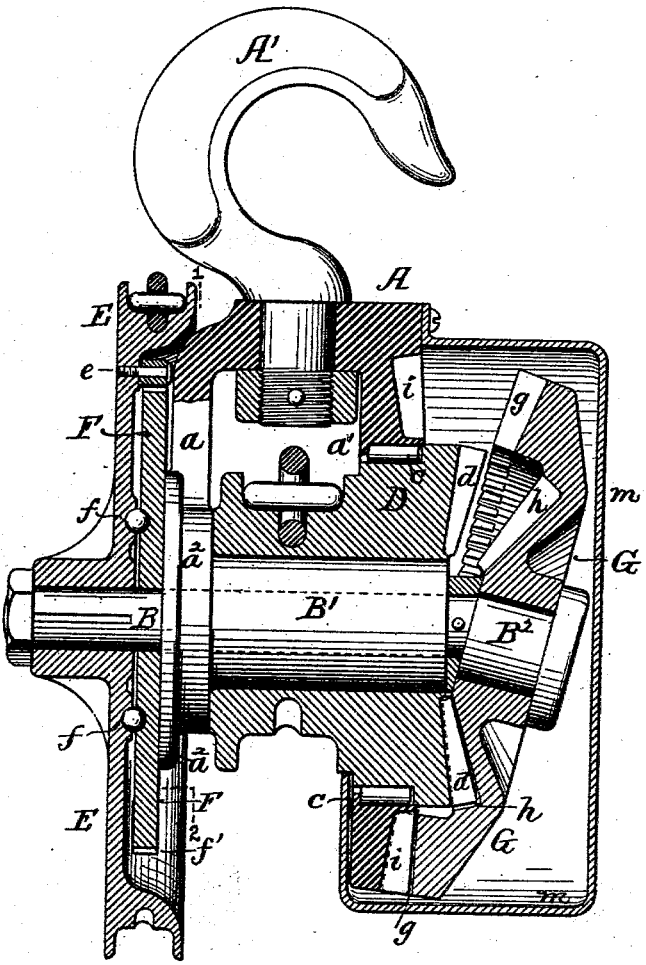
Witnesses:
F. D. Goodwin
R. Schleicher
Inventor:
Willard T. Sears
by his Attorneys
Howson & Howson (No Model.) 2 Sheets—Sheet 2.

W. T. SEARS.
DIFFERENTIAL HOIST.

No. 515,696. Patented Feb. 27, 1894.

Witnesses:
H. D. Goodwin
R. Schleicher

Inventor:
Willard T. Sears
by his Attorneys
Howson & Howson

UNITED STATES PATENT OFFICE.

WILLARD T. SEARS, OF PHILADELPHIA, PENNSYLVANIA.

DIFFERENTIAL HOIST.

SPECIFICATION forming part of Letters Patent No. 515,696, dated February 27, 1894.

Application filed May 31, 1893. Serial No. 476,049. (No model.)

*To all whom it may concern:*

Be it known that I, WILLARD T. SEARS, a citizen of the United States, residing at Philadelphia, Pennsylvania, have invented certain Improvements in Differential Hoists, of which the following is a specification.

The object of my invention is to so construct a differential hoist that it will be compact, and easily operated, and which can be made cheaply. This object I attain in the following manner, reference being had to the accompanying drawings, in which—

Figure 3:
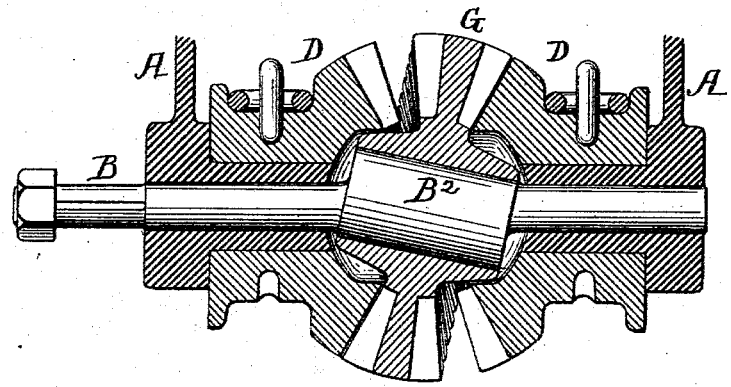
Figure 4:
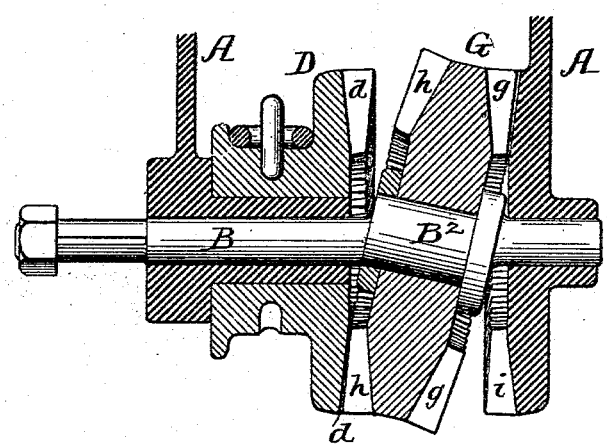

Figure 1, is a sectional view of my improved hoist. Fig. 2, is a transverse sectional view on the line 1—2, Fig. 1. Figs. 3 and 4, are views of modifications of my invention.

A is the frame of the hoist, having the usual hook A', secured to it, and depending from the frame are arms $a, a'$, and extending from the arm $a$ is a bearing B'. In the bearing B' is mounted the driving shaft B and mounted upon the bearing B' is the load chain wheel D, having its bearings also in the arm $a'$ of the frame A. In the present instance, I mount between this chain wheel and the bearing, anti-friction rollers $c$.

E is the hand chain wheel, keyed to the shaft B, so that when this wheel is rotated by the hand chain, it will turn the shaft.

Between the hand wheel E and the bearing $a$ is a friction disk F, loosely mounted on the shaft, and between the wheel E, and this disk are anti-friction rollers $f$; but the disk rests against the surface $a^2$ of the arm $a$ so as to create sufficient friction to operate as a brake.

On the wheel E is a pawl $e$ engaging with the teeth $f'$ on the periphery of the disk, so that when the wheel is turned in one direction, as indicated by the arrow, the pawl will travel over the teeth, but when the wheel is reversed the pawl engages with the teeth, so that the friction disk will travel with the wheel.

I utilize the end thrust to create friction between the two parts by the arrangement of bevel gearing which I will now proceed to describe.

On the end of the shaft B is an eccentric $B^2$, arranged at an angle to the center line of the shaft, as shown in Fig. 1, and upon this eccentric is mounted a double bevel wheel G, having two sets of teeth $g$ and $h$, the set $h$ being within the set $g$, in the present instance. On the face of the load chain wheel D are bevel teeth $d$ with which mesh the teeth $h$ of the bevel wheel G, and on the face of the frame A are bevel teeth $i$ with which mesh the teeth $g$. In fact the wheel meshes with the teeth $d$ and $i$ on the same radial line, and as the shaft is inclined, as well as eccentric at the end, the bevel gear wheel G will travel upon the toothed portions of the frame A, and the load chain wheel D, as clearly understood by referring to the drawings, and if the frame has the same number of teeth as the teeth on the wheel, and the load chain wheel has one tooth less than the wheel G, then there would be a differential movement of one tooth at each revolution. It will be understood that the number of teeth on either part may be increased or diminished according to the differential movement required. The weight of the load will naturally regulate the frictional contact between the face of the arm $a$ and the friction plate F, so that the pressure exerted is not so great when a light load is lowered as when a heavy load is lowered.

In Fig. 3, I have shown a double hoist using two load chain wheels. In this instance I mount the bevel gear wheel between the two load chain wheels and the gear wheel has bevel teeth on each side which mesh with the teeth on each load chain wheel, the difference in the number of teeth on one or both of said parts, will give the necessary differential movement.

In Fig. 4, I have shown the bevel gear wheel having teeth on each side mounted between the frame and the load chain wheel, the teeth of one side meshing with the teeth on the frame, and the teeth on the opposite side meshing with teeth on the load chain wheel. It will thus be seen that the arrangement of teeth may be modified without departing from my invention.

I claim as my invention—

1. In a differential hoist, the combination of a driving shaft, and a driven part by which the load is raised or lowered, with two pairs of beveled gears through which a differential motion is imparted to the driven part from the driving shaft, the driving gear having two sets of teeth thereon and mounted upon an eccentric inclined to the driving shaft, substantially as described.

2. The combination in a differential hoist, of the driving shaft, the driving gear mounted upon an inclined eccentric upon the driving shaft, two sets of bevel teeth thereon, a frame, teeth on said frame meshing with one set of bevel teeth, a load chain wheel having teeth meshing with the other set of bevel teeth, substantially as set forth.

3. The combination in a differential hoist of the driving mechanism consisting of the driving gear inclined to the driving shaft and having two sets of bevel teeth upon its face, a driven part a fixed part having teeth, the bevel teeth of the driving gear meshing with each of said parts, and differentially geared, substantially as described.

4. The combination of the driving shaft, the load chain wheel mounted loosely thereon, and having teeth in its face, the fixed frame, teeth thereon, an inclined eccentric on said driving shaft, a bevel gear mounted on said eccentric, and having two sets of teeth upon its face, differentially geared to the teeth on the frame, and the teeth on the load chain wheel, substantially as described.

5. The combination of the frame, the driving shaft the load chain wheel mounted within the frame, teeth on the frame and teeth on the load chain wheel, an eccentric on the shaft, bevel gear wheel mounted on said eccentric having two sets of teeth on one face, the inner set of teeth meshing with the teeth on the load chain wheel, and the other set meshing with the teeth on the frame, substantially as described.

6. The combination in a hoist of the frame having friction surface $a^2$, a driving shaft, the bevel gearing, inclined to the driving shaft, a drive chain wheel, a friction plate mounted between the chain wheel and the friction surface of the frame, whereby the said friction plate is held in frictional contact with the latter by the end thrust of the said bevel gearing, teeth on the friction disk, and a pawl mounted upon and carried by the chain wheel, engaging the teeth, substantially as described.

In testimony whereof I have signed my name to this specification in the presence of two subscribing witnesses.

WILLARD T. SEARS.

Witnesses:
H. F. REARDON,
HENRY HOWSON.